Figure 1:
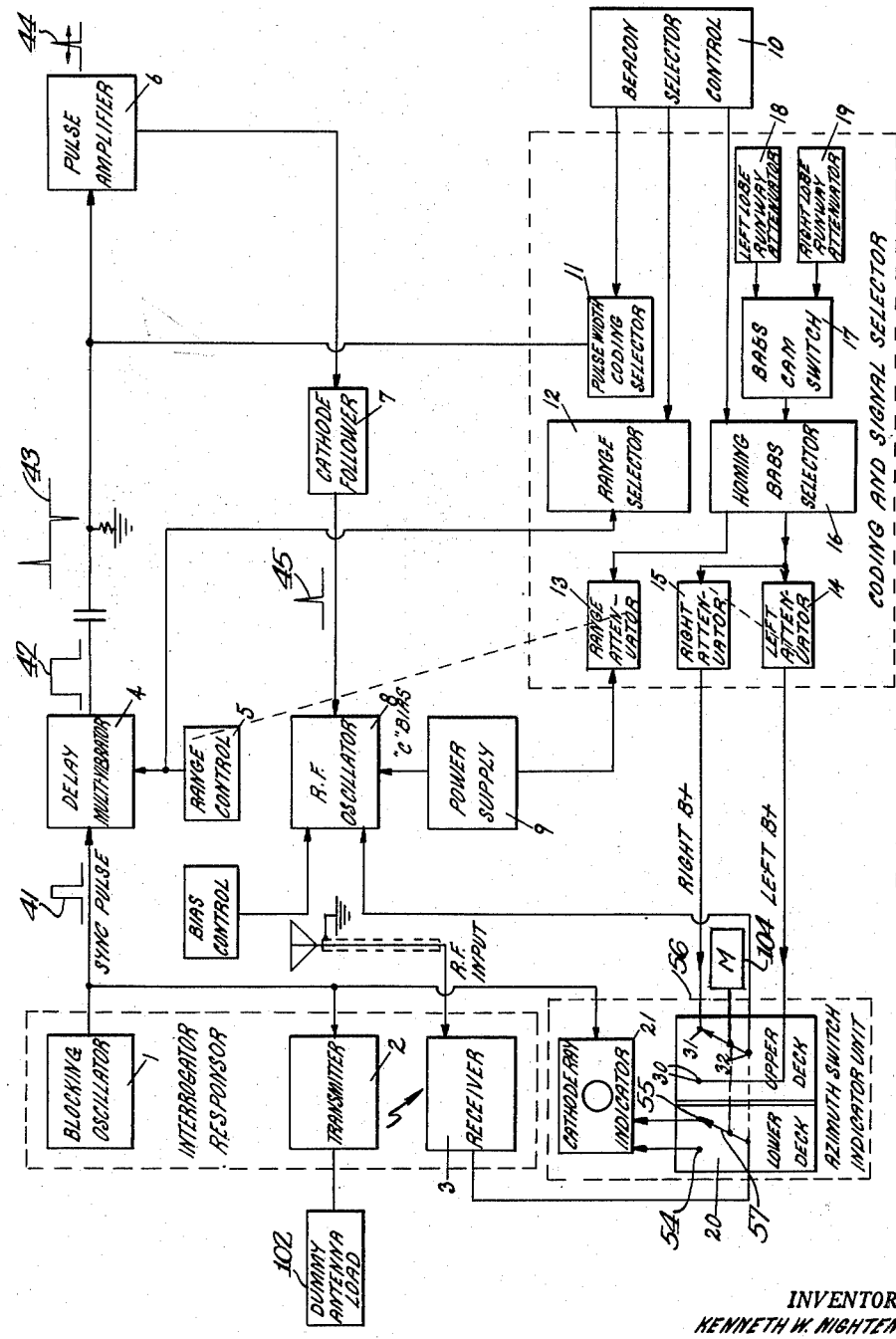

INVENTOR.
KENNETH W. NIGHTENHELSER
BY
William D. Hall
ATTORNEY

Aug. 8, 1950  K. W. NIGHTENHELSER  2,517,591
RADAR NAVIGATIONAL TRAINING EQUIPMENT
Filed Jan. 3, 1945  4 Sheets-Sheet 4

INVENTOR.
KENNETH W. NIGHTENHELSER
BY William D. Hall.
ATTORNEY

Patented Aug. 8, 1950

2,517,591

UNITED STATES PATENT OFFICE 2,517,591

RADAR NAVIGATIONAL TRAINING EQUIPMENT

Kenneth W. Nightenhelser, Dayton, Ohio, assignor to the United States of America as represented by the Secretary of War Application January 3, 1945, Serial No. 571,190

14 Claims. (Cl. 35—10.2)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to trainers employing electronic circuits to simulate radio navigation and communication phenomena.

An object of the invention is to employ as many of the existing radio components as is possible to simulate such conditions so that a student will familiarize himself with the equipment and the phenomenal indications thereof simultaneously.

A further object is to provide a trainer unit which will embody the necessary changes to standard equipment in a self-contained unit so that connections with the standard equipment will be simple, efficient and quickly made.

A further object is to provide controllable electronic means in such equipment to simulate variable range, azimuth and homing signals and various combinations of such signals.

Another object is to provide means for simulating coded received signals to simulate IFF secret communication.

These and other objects will appear throughout the specifications and will be particularly pointed out in the claims.

In the utilization of electronic navigation and communication equipment for aircraft, training of personnel has become of paramount importance. Such equipment is of novel arrangement, form, and indication, and must be familiar to a flyer in conjunction with aircraft control and manipulation. Demonstration of the equipment for training should be conducted as far as possible, under conditions of safety as well as of realism.

The flight of the airplane is made the imaginary element of the system. Simulation of distance between the imaginary plane being flown and the beacon or object to which the receiver of the imaginary plane is attuned being variable manually or by action of a delay motor. Different types of signals such as homing beacon signals, runway BABS signals or azimuth off-course signals are all controllable by a dial or by switches from the panel of the trainer unit.

In a preferred embodiment of the invention the trainer may be manufactured as a separate unit, and used in connection with Interrogator-Responsor units, such as Radio Receiver and Transmitter B.C.-800-A in combination with Indicator B.C.-929-A, described in the "Handbook of Maintenance Instruction for Radio Set SCR-729-A," a Signal Corps publication forming standard IFF (Identification—Friend or Foe) equipment on aircraft. IFF equipment is well known in the art and is fully discussed in volume 3 of Radiation Laboratory Series "Radar Beacons" by Roberts, published by McGraw-Hill, covering work done prior to the present disclosure. Synchronizing pulses from the Interrogator-Responsor are applied to the input circuit of the generator portion of the trainer which generates signals that simulate responses from various beacons. This generator unit also provides mechanical switching to simulate coding, and switches for the selection of desired signals. The generator contains in its circuit a radio frequency oscillator, which is modulated by the video signals generated in that channel. The resulting radio-frequency pulses are coupled into the receiver antenna input of the Interrogator-Responsor unit. These radio-frequency pulses are detected in the receiver of the Interrogator-Responsor unit and the video pulses applied in the normal manner to the oscilloscope.

Thus, so far as the student is concerned, the indications on the oscilloscope, or other indicator, are similar to those occurring under flight conditions. Two indicators may be connected in parallel in order to provide separate indications for instructor and student.

The indications on the cathode tube viewing screen are chosen to resemble the ordinary navigational indicia. For instance, by ganging the range control with the range attenuator the distance pulse indication image can be raised vertically along the center reference line and in so doing the size of the indication image is gradually diminished as it is brought vertically towards the top.

The width of the pulse image is likewise subject to control so that any sequence of wide or narrow pulse images (in the vertical direction) may be impressed on the screen for coding instruction.

The conventional long right and short left lobe directional indication is also controllably impressed on the screen to indicate azimuthal direction, including the side-veering runway approach indication commonly referred to as "crabbing."

Operation of the motor-driven switch 20 in the Azimuth Switch Indicator Unit 56 of the Interrogator-Responsor is retained to simulate switching of the antennae to obtain a left and right indication on the screen of the oscilloscope. This motor-driven switch alternates 30 times per second so as to produce a constant image on the screen due to persistence of vision at this rate of cycling. Due to the fact that this switch is a standard part of the oscilloscope it is not shown in the drawings other than diagrammatically in Fig. 1. The contacts are designated as 30, 31, 54 and 55, the armatures are designated as 32 and 57. The method of connecting this switch into the trainer circuit, however, is such that instead of switching antennae, the B+ voltage to the oscillator tube 8 (Fig. 2) is alternately switched from a high voltage level to a low voltage level by armature 32. Contacts 54 and 55 are connected to the right and left horizontal deflection circuits of indicator 21. Armatures 32 and 57 are synchronized so that the outputs of receiver 3 are connected to right and left deflection plates to compare the amplitudes of the receiver outputs corresponding to high and low level oscillations.

Figure 2:
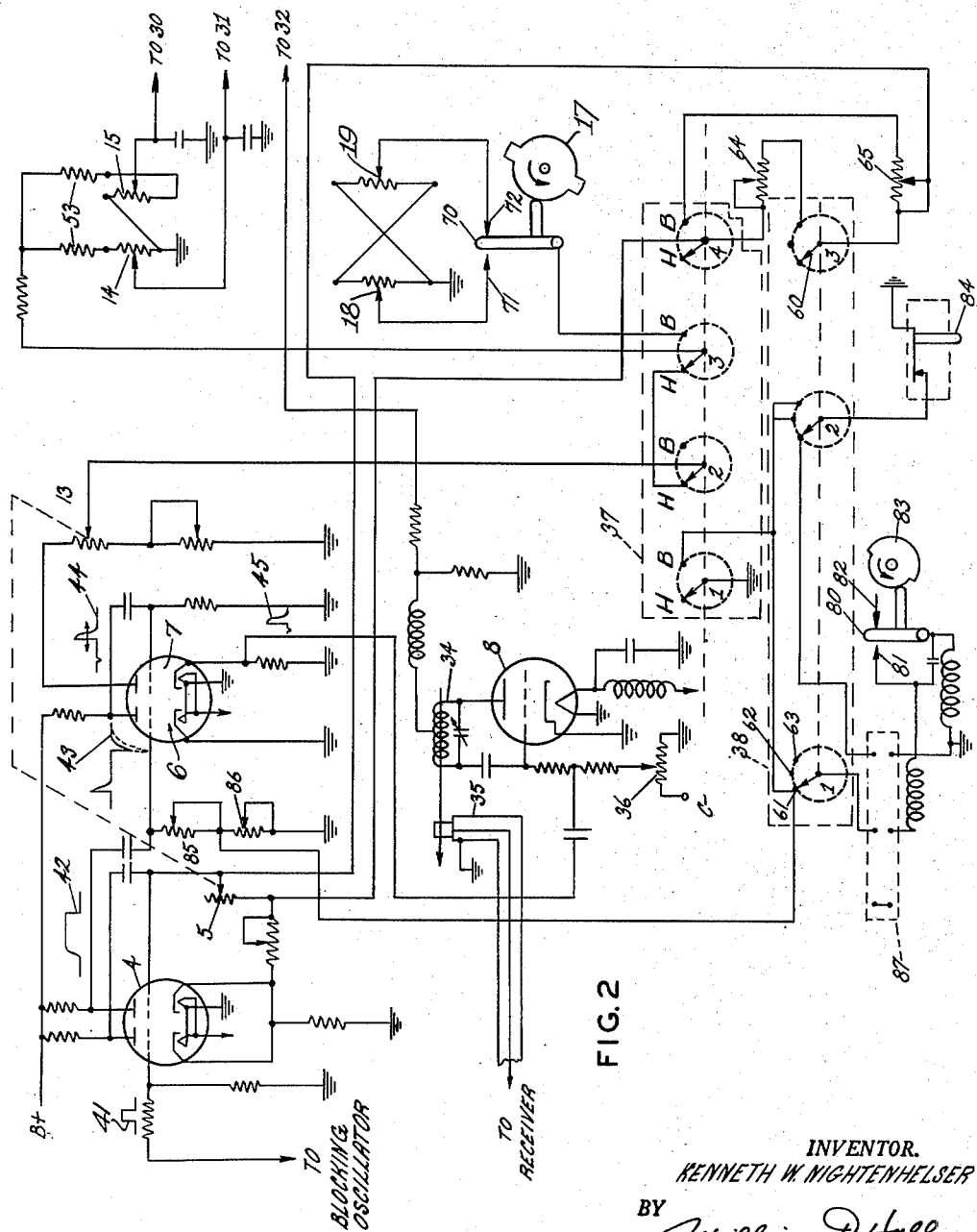
Figure 3:
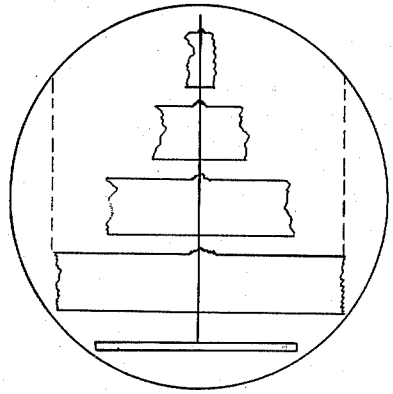
Figure 4:
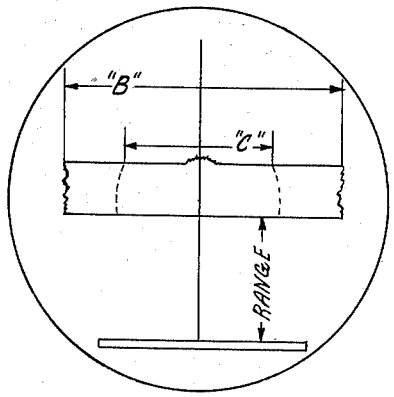
Figure 5:
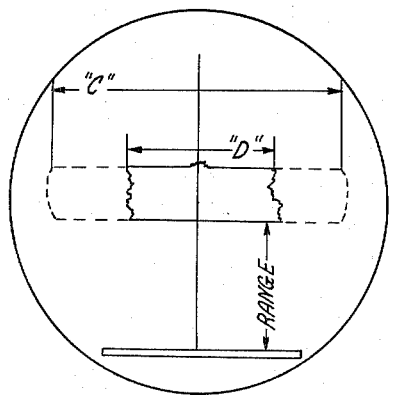
Figure 6:
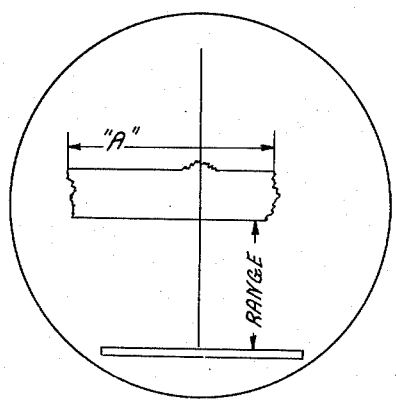
Figure 10:
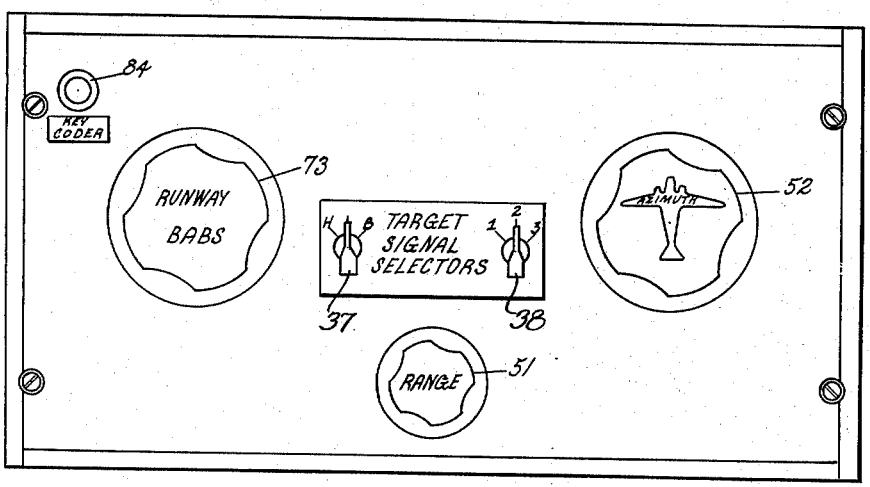
Figure 8:
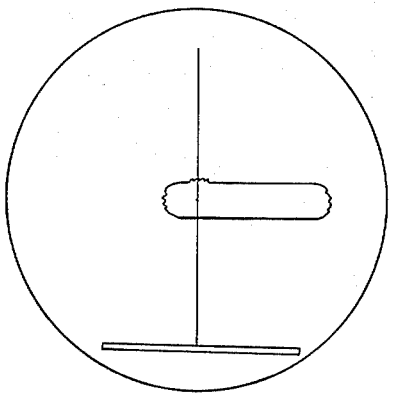
Figure 9:
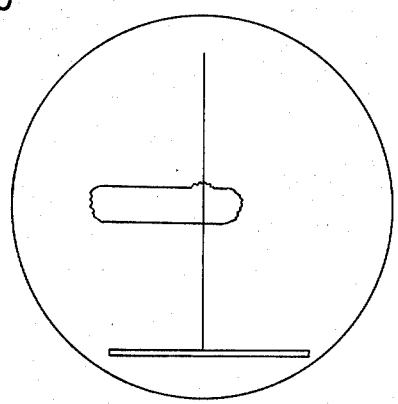
Figure 11:
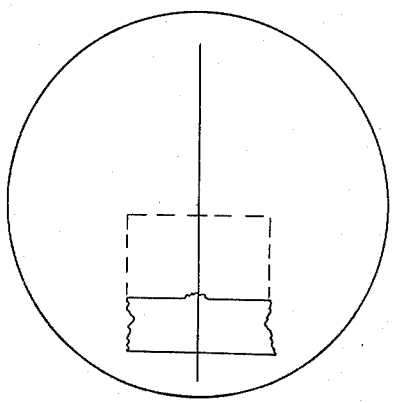

Referring to the drawings wherein like numerals denote like parts,

Fig. 1 is a diagrammatic block plan view of the circuits and equipment embodying the invention, Fig. 2 is a schematic, diagrammatic view of the circuits shown in Fig. 1, Fig. 3 is a diagrammatic illustration of the screen of a cathode ray tube, illustrating the simultaneous reduction of pulse image dimension as it is progressively brought vertically up the reference line to simulate range. The dotted outline illustrates what would be meaningless width of image without simultaneous dimensional reduction, Fig. 4 is a similar view to that of Fig. 3, the indication on the screen being that visible when the pilot is observing a BABS or Beacon Approach Landing Signal on the 1-second or "dash" side of the runway, Fig. 5 is a similar view to that of Fig. 4 showing off-course BABS to the "dot" or .2-second side of runway, Fig. 6 is a similar view to that of Fig. 4, illustrating a BABS signal in a veering position commonly referred to as "crabbing," wherein the aeroplane is on-course over the runway, but is not headed straight in the direction of flight, Fig. 7 is a BABS "on course" signal indication, Fig. 8 is a similar view to that of Fig. 6, illustrating azimuthal homing beacon off-course bearing of the airplane to the left, when on "homing" beacon signals, with beacon to the right, Fig. 9 illustrates azimuthal homing beacon off-course bearing of the airplane to the right, with beacon to the left, Fig. 10 is a skeleton vertical elevation of the trainer unit control panel, and Fig. 11 illustrates the vertical widening of the pulse indication during coding, that is, communication by code.

The term "BABS" is an abbreviation for "Blind Approach Beacon System" which uses certain types of special radar equipment to indicate the location of a landing strip on an airfield which is to be used by the aircraft to be landed. In many respects, it is similar to the standard beam approach, that is, an equi-signal zone or beam in line with the runway, and a dot and dash sector on the two sides of the approach line. There are, however, certain differences. The BABS beam is uni-directional and has a reliable useful range of about 20 miles. It gives a continuous indication of the distance of the aircraft from the beacon and indicates the heading of the aircraft in such a way that the amount of cross-wind can be estimated by the pilot due to veering or "crabbing." On one side of the runway the lobe pattern of radiation representing the dots, the signal lasts for .2 second and on the other side for 1 second so that the short "dot" and long "dash" signals are easily distinguishable.

The BABS system does not employ the standard beam-approach procedure for losing altitude by reference to marker beacons, and for this reason, pilots who are accustomed to these marker beacons will inevitably face disaster if training in the use of the BABS signals is not had. Due to the arrangement of the parts of the trainer, it is possible to train a pilot and radar operator simultaneously by connecting two oscilloscopes to the trainer unit and employing the interphone between them for more realistic conditions.

Figure 7:
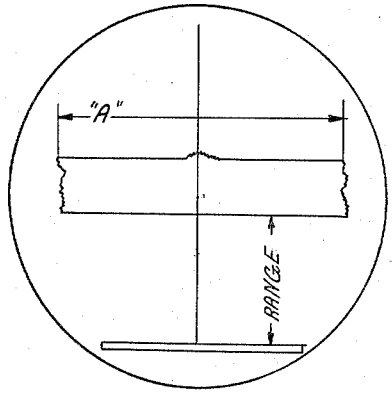

To further explain the nature of the oscilloscope indications, reference may be had to Fig. 7, where the "on course" BABS indication is illustrated. Range is measured from the transmitter blip to the lower edge of the BABS pulse. When the aircraft is flying the "on course" beam, the over-all amplitude of the pulse as represented by dimensional line "A" is constant. No evidence of dot or dash coding will be visible such as is the case when off-course. This does not mean that the echo or pulse need necessarily be equally spaced across the vertical trace when "on course," for if the airplane is veering or "crabbing" the pulse indication will be displaced to one side as in Fig. 6.

When the airplane is off to the right or "dash" side of the runway, there is a momentary collapse of the echo or pulse indication occurring at regular intervals.

In Fig. 4 this is illustrated, the dimension line "B" representing the amplitude of the longer interval of coded time and dimension line "C" is the momentary collapse, which would correspond to the "dot" signal. It appears to the observer, then, that the pulse's normal size is the length of "B" broken at regular intervals by short decreases to "C."

The "dot" or left field indication to the left of the beam is a momentary increase in the echo or pulse indication occurring at regular intervals. Fig. 5 shows the effect when the aircraft is off to the left of the beam and is the opposite of that in Fig. 4. Here the normal amplitude of the echo "D" momentarily increases to the amplitude "C" at regular intervals. The ratio of maximum to minimum echo or pulse can thereby indicate to the pilot how far the aircraft is off course.

It is obvious that the device herein described will prove invaluable to train pilots in the technique of blind flying especially when this trainer is used in conjunction with other flight training paraphernalia dealing with the other problems of aircraft flight and control.

*Circuits*

Referring to the drawings, in Fig. 1, blocking oscillator 1 (free running) supplies synchronizing pulses to the delay multivibrator 4 which is used to generate a pulse of variable width. This width is controlled by variable resistor 5 which is operated by Range knob 51 (see Fig. 10) on the front panel. The output of delay multivibrator 4 is differentiated and the negative pulse 43 which is formed at the late edge of the multivibrator is used to cut off pulse amplifier 6. The output of pulse amplifier 6, a positive pulse, is applied to the radio frequency oscillator 8 via cathode follower 7 as a modulation pulse. The width of this modulation pulse may be varied by pulse width and coding selector 11. Range selector 12 is used to shunt out range control 5. In this manner the maximum range of the simulated beacon signal is controlled. Radio frequency oscillator 8 is normally inoperative and generates pulses of radio frequency energy only when modulated by the output pulse from cathode follower 7. Range attenuator 13 is ganged with range control 5 in order that the B plus plate voltage applied to the tube associated with radio frequency oscillator 8 may be reduced as the range of the beacon signal is increased. Beacon selector control 10 is the front panel control which is used to select the proper pulse width, coding, and range for each type of beacon. BABS cam switch 17 is a motor driven switch which is used to select the left-right lobe runway attenuator. Left lobe runway attenuator 18 and the right lobe runway attenuator 19 are ganged by means of a common shaft which extends through the panel to knob 73 (Fig. 10). The output of the BABS homing selector 16 is connected to azimuth controls, that is, left attenuator 14 and right attenuator 15. These controls are also ganged together by a common shaft. The outputs of attenuators 14 and 15 are connected to the upper deck of azimuth switch 20. The armature 32 of the upper deck of switch 20 is connected to the tank coil 34 (Fig. 2) of radio frequency oscillator 8. The power output of radio frequency oscillator 8 is controlled by the action of range attenuator 13, left azimuth attenuator 14, right azimuth attenuator 15, BABS left attenuator 18, and BABS right attenuator 19. It is a well known fact that the radio frequency output level of an oscillator is dependent upon the plate voltage applied to the oscillator tube. It can be seen that the settings of range attenuator 13, left azimuth attenuator 14, right azimuth attenuator 15, BABS left attenuator 18 and BABS right attenuator 19 control the amplitude of the signal generated by radio frequency oscillator 8. In this manner the signal received at the radio frequency input of receiver 3 is controlled at will to simulate flight conditions of azimuth, range, coding, and runway approach. Synchronizing pulses from blocking oscillator 1 are used to fire transmitter 2 and start a sweep in cathode ray indicator 21 at the same time that the delay multivibrator 4 is actuated. Receiver 3 is situated in proximity to transmitter 2 and, therefore, a radiated pulse effected by the firing of transmitter 2 will be received by receiver 3. This received radiated pulse will cause a reference blip to be displayed on the cathode ray indicator 21. Dummy antenna 102 is connected as a load to transmitter 2 to prevent destruction to the transmitter tube.

The azimuth switch 20 is driven by motor 104, the arms of the upper and lower deck being switched at the same time to provide synchronism for the left-right indication. This switch is actuated 30 times per second. Attenuators 14 and 15 are connected in such a manner that when left azimuth attenuator 14 supplies a high plate voltage for the left indication the right azimuth attenuator 15 is at a low voltage. This is also true of BABS left attenuator 18, and BABS right attenuator 19.

Range

Referring to Fig. 2, range is simulated as follows: Pulses 41 are obtained from a free-running blocking oscillator in the interrogator-responsor unit, which pulses trigger the delay multivibrator 4. The particular range indication desired on the screen of the oscilloscope 21 is selected by turning knob 51 on the trainer panel (Fig. 10). This knob controls the ganged resistors 5 and 13 so that as greater delay (widening of pulse 42) is obtained, decrease of the amplitude on the oscilloscope takes place as shown in Fig. 3. The output pulse 42 of multivibrator 4 is differentiated to form negative pulse 43 which coincides with the trailing edge of pulse 42. This negative pulse is then amplified through pulse amplifier 6. The positive output pulse 44 of the amplifier is sent through a cathode follower 7 to radio frequency oscillator tube 8. This oscillator tube is grid modulated and oscillates only during the time that the positive cathode follower output pulse 45 appears at its control grid. The radio frequency signals generated by this oscillator through tank network 34 are picked up by a pick-up wire 35 which is preferably a coaxial cable, the end of which is shrouded by an adjustable sleeve (not shown) to adjust the attenuation of signal desired. The oscillator tube 8 is operated at cut-off normally until actuated by the modulating pulse 45. Cut-off bias is obtained by means of voltage divider variable resistance 36.

The picked-up radio frequency signals generated by the oscillator 8 are transferred by cable 35 to the input of the receiver contained in the interrogator-responsor unit. Due to the mutual inductance between the radio frequency pick-up wire 35 and the oscillator tank network 34, no antenna as understood in the ordinary sense, is required.

Azimuth indication

To simulate azimuth signal variations, which operation is intended to teach the student not only off-course but crabbing angle indications as well, the following sequence is performed. A pair of oppositely ganged potentiometers 14 and 15 are controlled by the dial 52 on the trainer front panel (Fig. 10). These attenuator potentiometers are so connected that their outputs vary inversely; that is, when one attenuator is adjusted to pass a high voltage, the other is oppositely positioned to pass low voltage. The B+ voltage line into which these potentiometers are inserted passes through the 4-deck, 2-position switch 37 and this voltage is applied across both members. When the radio frequency output has been detected in the receiver 3 and applied to the video channel and the cathode ray oscilloscope, the right and left indicator deflections thereof will have amplitudes corresponding to the respective settings of the two potentiometers. With the potentiometer knob 52 in the center position, the outputs are equal, giving equal left and right indicator deflections and corresponding to zero azimuth or "on course" indications as in Fig. 3. When the knob 52 is turned away from center, the left or right deflection signal indication is greater in accordance with the direction in which the knob 52 is turned.

The additional resistors 53 in series with the potentiometers 14 and 15 improve the azimuth control characteristics.

The radio-frequency output of the oscillator 8 is a function of its plate supply voltage. Since the voltage applied to the oscillator is controlled by the setting of potentiometers 14 and 15, which are alternately connected to the circuit by a motor-driven single-pole double-throw switch making 30 make-and-break cycles per second, and since this circuit is in the video circuit of the oscilloscope, the image impressed varies thereon directly with the setting of potentiometers 14 and 15. Therefore, when this control switch is in such position that the potentiometer controlling the left video azimuth indication is at a high voltage setting, the greater output of oscillator 8 will go to the left azimuth video channel to make this appear stronger, while at the same time during the 30 per-second alternations the right azimuth video channel is receiving the lesser output of oscillator 8 to display a weaker signal in comparison to the left.

Range reducing circuit

Range reduction indications are provided to simulate similar phenomena in actuality. For instance the three deck switch 38 has three positions in each deck. When the armature 60 is in position 63, it switches variable resistor 64 into the range determining circuit, and an intermediate range is established, for instance of 35 miles on the "homing" position "H" of 4 deck switch 37. When switch 37 is set on "B" or "BABS" position, variable resistor 65 is switched into the circuit, further reducing the range, for instance to about 20 miles. There are no connections on position 62 and 63 of deck "3" of switch 38. However, when switch 37 is in "H" position, resistor 13 alone determines the range, for instance, of about 80 miles. This difference in range is discernible on the screen of the cathode ray oscilloscope by a diminution in the size of the indication fluorescence.

BABS runway azimuth

In order to select these signals, switch 37 is set in the "B" position. When this type of signal is being received in actual flight, the system operates as follows: The beacon transmitter is located at the far end of the landing strip runway on the airfield. When the beacon is being interrogated by the Interrogator-Responsor of the airplane, the beacon, which is ordinarily a transponder, transmits two directional patterns. First it transmits a directional pattern beam slightly off to the right of the runway (from the viewpoint of the approaching aircraft). This transmission continues for approximately one second. Then the right-pattern is cut off and a beam is transmitted to the left of the runway for about 0.2 second. Following this the left beam is cut off and the right-left cycle repeated as long as the beacon is in operation. An aircraft right over the runway receives equal signals when either beam is on since the craft is in a field of equal signal strength as respects both right and left beam. Under these conditions a steady signal, without flicker, will be shown on the indicator of the oscilloscope as in Fig. 7. However, if the aircraft is off to the right of the runway, the amplitude of the 1-second signal will be greater than that of 0.2-second signal due to the difference in the field vector strengths. Hence, an amplitude flicker will be observed on the indicator as in Fig. 4. Likewise, if the aircraft is off to the left of the runway, the amplitude of the 0.2-second signal will be greater and the indication will be as shown in Fig. 5. In general, the discrepancy between the two amplitudes is an indication of the angle by which the aircraft is off the runway, provided that this angle is not excessively great.

This effect described is simulated in the training circuit by means of the cross-ganged potentiometers 18 and 19 and the single pole, double throw switch lever 70 operated by cam 17. Cam 17 has two approximately 30-degree operating periods, diametrically spaced, and has a period of revolution of about 2.5 seconds. Therefore, switch lever 70 is thrown to left position 71 for 0.25 second, then remains unoperated in position 72 for 1 second, and the cycle repeats twice for each revolution of cam 17. This approximates the timing of the actual BABS signals. As a result, the output of one section of the crossed-potentiometers 18 and 19 is applied to the plate of the oscillator 8 for 0.25 second; then the output of the other section is in turn applied for 1 second and repeats in synchronism with switch 70. When the "Runway BABS" knob 73 is in center position, the output voltage of both potentiometer sections are equal, resulting in an unvarying amplitude of the output pulses of the oscillator 8. If this knob is turned to the right, the voltage applied to the plate of oscillator 8 is less during the 0.25 second interval when switch 70 is actuated to make contact 71 than it is during the 1 second interval when switch 70 is on contact 72. When the knob 73 is turned to the left, the indicator oscillogram resembles that obtained when an aircraft is to the left of the runway due to the fact that the amplitude of the left indication is greater in proportion to the lesser resistance on left potentiometer attenuator 18 than in right potentiometer attenuator 19. The opposite would be true if knob 73 is turned to the right.

Homing-BABS signal selector switch

Switch 37 is a two-position four deck switch, the first position or "H" Fig. 10, producing the "homing" signals and the "B" position reproducing the "BABS" or Beacon Approach Azimuth Bearing Signals. The sections are numbered consecutively 1 to 4 starting with the section nearest the knob 37, Fig. 10, and in Fig. 2 are numbered consecutively from left to right within the broken circles. On section 1 there is no connection to position "H", but on position "B" all beacon coding, automatic and manual, that is, from cam 83 to switch 80, or from switches 84 and 87, is shorted out through sections 1 and 2. On position "H" sections 2 and 3 connect the "B" supply voltage across the azimuth control potentiometers 14 and 15, as explained under "Azimuth Indication" above.

Beacon target selector switch

The beacon target selector switch 38 has three positions. These positions simulate different signals. For instance, in position 1, Fig. 10, there is provision for automatic coding, by means of the 180 degree cam 83, or manual coding, accomplished by pressing the push-button keying switch 84. Position 2, Fig. 10, has manual coding only, using switch 84. The reason for separate contacts at positions 1 and 2 of deck switch 38 is to provide for a different source of power for manual coding.

In position 1, Fig. 10, switch 38 connects the junction of variable resistors 85 and 86 through double pole double throw coding switch 87 to the cam switch 83 when in the left position. When switch 87 is in right position these resistors are thrown into the circuit of the push button coding switch 84. During the time that switch 80 is in right position on contact 82, both resistors are in the circuit which gives a wide pulse. When switch 82 is in left position on contact 81 through the action of 180-degree cam 83, resistor 86 is shorted to ground, giving a narrower pulse. The same action is accomplished by means of the keying, push-button switch 84 when the coding switch 87 is thrown to the right, the connection to switch 84 being made through deck 2 of switch 38. Section 2 of switch 38 likewise serves to complete the circuit connecting switch 84 with resistors 85 and 86 when switch 38 is in position 2.

While the invention has been illustrated and described in its preferred embodiment it is anticipated that changes in the details of the circuits and apparatus may be made within the spirit and scope of the appended claims.

Having thus described the invention, what is claimed is:

1. In a training device, in combination, interrogator-responsor means including a blocking oscillator and an oscilloscope, generator means triggered by said blocking oscillator, said generator means comprising means for generating indications of range, azimuth, and beacon approach runway signals for display on said oscilloscope, and a motor-driven cam switch to interrupt said indications in a pre-determined sequence thereby duplicating signals received during flight conditions.

2. In a training device, the combination of electronic generating means for generating radio-frequency signals and interrogator-responsor means, said latter means comprising a radio receiver receptively tuned to said signals, a cathode ray oscilloscope electrically coupled to said signal receiver, manual switching means in circuit with said generating means for selecting a desired type of signal, electrically driven cam-switching means for repetitively breaking said circuit to produce a sequence of signals for indication on the screen of said oscilloscope, and manually adjusted attenuating means in said circuit for varying the strength of the selected signals.

3. In a training device, in combination, interrogator-responsor means comprising a blocking oscillator for producing synchronous trigger pulses, a transmitter triggered by said pulses to transmit reference signals, a cathode ray oscilloscope having a sweep circuit synchronized by said pulses, a receiver, a radio-frequency oscillator, said receiver being resonantly tuned and receptive to the radio-frequency energy transmitted by said radio-frequency oscillator and said transmitter, and having its output in circuit with said oscilloscope, and variable means coupling said blocking oscillator to said radio-frequency oscillator for variably delaying the signals transmitted by said radio-frequency oscillator in relation to said synchronous pulses, whereby said oscilloscope is made to indicate on its screen the synchronous reference signals and the delayed signals thereby indicating any selected range between an imaginary beacon and the receiver.

4. A training device as claimed in claim number 3 wherein said variable delay means comprises a delay multivibrator circuit and a variable resistor to control the multivibrator output time-constant.

5. In a training device, in combination, interrogator-responsor means comprising a blocking oscillator for producing synchronous signals, a transmitter triggered by said synchronous signals to produce reference signals, a radio-frequency oscillator, a receiver for receiving and a cathode ray oscilloscope for indicating said reference signals and signals from said radio-frequency oscillator, said oscilloscope having its sweep circuit in circuit with said blocking oscillator, variable means for variably delaying said radio-frequency signals in circuit between said radio-frequency oscillator and said blocking oscillator, and oppositely paired attenuator means in circuit between said radio frequency oscillator and said oscilloscope for relatively and variably increasing one signal input to said oscilloscope while simultaneously decreasing an opposite signal input to said oscilloscope thereby indicating azimuthal direction.

6. The combination in a training device of interrogator-responsor means comprising a blocking oscillator for producing synchronous signals in circuit with a radio-frequency oscillator for producing radio frequency signals, a cathode ray oscilloscope having a sweep circuit synchronized by said synchronous signals from said blocking oscillator, a radio receiver resonantly tuned and receptive to said transmitted radio-frequency signals and having its output in circuit with said oscilloscope, variable delay means for varying the delay of said transmitted signals in relation to said synchronous sweep signals, said delay means comprising a delay multivibrator having variable resistance and attenuator means in its output circuit, said multivibrator being in series connection between said blocking oscillator and said radio-frequency oscillator, whereby the receiver output signals to the oscilloscope may be variably spaced on the oscilloscope screen in relation to the synchronous sweep signals to indicate range and means for variably attenuating in opposite phase a right and a left signal channel in said oscilloscope thereby indicating azimuthal bearing on said oscilloscope screen.

7. In a trainer, the combination comprising a radio transmitter receiver, a blocking oscillator therein in circuit with a transmitting oscillator, a load-absorption resistor connected to the output of said transmitter to absorb said normal antenna output load of the transmitter, an oscilloscope in circuit with said blocking oscillator and said transmitting oscillator, and attenuation and delay means in the video circuit between said receiver and said oscilloscope whereby delayed and variably attenuated comparison signals of range or azimuth are displayed on said oscilloscope.

8. In a trainer, the combination comprising a radio communication transmitter-receiver, a blocking oscillator synchronizing circuit therein coupled to a free-running oscillator, a load-absorption resistor connected to the output of said transpondor to absorb the normal antenna output load of said transmitter, switching and attenuating means in said free-running oscillator circuit for signal type and strength selection and an oscilloscope in circuit with said receiver and blocking oscillator for depicting the output of said receiver in the conventional signal forms on the oscilloscope viewing screen.

9. The combination, in an aircraft radio navigation and communication trainer, of a source of power, and electronic signal generating, receiving and oscilloscope means; including a synchronizing pulse blocking oscillator having its output coupled to a transmitter-receiver unit, to an oscilloscope and to a delay circuit; a radio-frequency oscillator coupled to the output of said delay circuit and to an oscilloscope switching circuit; means for controlling the current input to said radio-frequency oscillator and control means for varying the time-constant delay of the delay circuit for varying the range and relative strength of signals displayed on said oscilloscope.

10. In combination with a transmitter-receiver, a radio wave oscillation generator and modulation means therefor including a synchronous pulse generating blocking oscillator, a variable delay network and an amplifying circuit for extending and amplifying the width of the synchronous pulse in the delay network, a cathode follower serially connected between said amplifying circuit and said oscillation generator, means for selecting a predetermined pulse indication on the oscilloscope of said transmitter-receiver, and coupling means for coupling the selected signals from said oscillation generator to the receiver.

11. In combination with a transmitter-receiver provided with a video signal indicator, a synchronous pulse blocking oscillator, the output of said oscillator being channeled in parallel to a delay network and to said transmitter-receiver to form a reference pulse therein; a radio-frequency oscillator and modulating means therefor, coupling means for applying the modulated signals to said indicator, oppositely ganged variable potentiometers in the circuit of the radio-frequency oscillator for variably attenuating signals from said oscillator in response to the common control setting thereof, and a vibrator switching device for alternately switching the radio-frequency oscillator from connection with one potentiometer to the other at a frequency greater than the normal persistence of vision thereby impressing on the screen of the oscilloscope a pair of simultaneously visible signals in relation to a reference position.

12. In combination with a transmitter-receiver provided with video-signal indicator means, a blocking oscillator for originating a synchronous pulse, the output of said oscillator triggering said transpondor to form the reference pulse, a separate radio-frequency oscillator and modulating means therefor, said modulating means being responsive to said pulse, coupling means for applying the modulated radio-frequency signals to the indicator unit of said transmitter-receiver, oppositely ganged variable potentiometers in the circuit of said radio frequency oscillator for variably attenuating signals from said radio-frequency oscillator in accordance with the variable setting of the common control of the potentiometers, vibrator switching means for alternately switching the radio-frequency oscillator from one section of the ganged potentiometer to the other at a frequency rate greater than the normal persistence of vision rate so as to impress on said indicator means a pair of simultaneously visible signals in relation to a reference position to indicate the relative strength thereof, and cam switching means for breaking up said persisting signals into coded sequences to simulate any desired type of coded communication.

13. A coding system as claimed in claim number 12 wherein the coding cam switch is operated by a cam having relatively long and short duration signals in sequence so that the resultant signals will simulate the BABS short left, long right runway beacon signals.

14. In a transmitter-receiver circuit, in combination, a blocking oscillator for generating a synchronous pulse for application to the sweep circuit of an oscilloscope, and to a delay multivibrator, a pulse amplifier coupled to the output of the delay multivibrator through a variable integrating-differentiating network, a cathode follower connected to the output of said amplifier to reverse the phase of the output pulse and apply the positive resultant pulse of low-impedance to an internal feed-back oscillator to modulate the output of said oscillator, electron coupling means for coupling the modulated radio-frequency oscillator output to the receiver and oscilloscope, and switching and attenuating means in the supply voltage circuit of said radio-frequency oscillator for selectively determining the desired types of signals to be triggered in the radio-frequency oscillator.

KENNETH W. NIGHTENHELSER.

REFERENCES CITED

The following references are of record in the file of this patent:

UNITED STATES PATENTS

| Number | Name | Date |
|---|---|---|
| 2,110,869 | Crane | Mar. 15, 1938 |
| 2,312,962 | De Florez | Mar. 2, 1943 |
| 2,359,294 | Blenman, Jr. | Oct. 3, 1944 |
| 2,438,888 | Andrews et al. | Apr. 6, 1948 |
| 2,438,940 | Pennoyer | Apr. 6, 1948 |
| 2,442,788 | Treptow | June 8, 1948 |